United States Patent [19]

Zappia

[11] 4,152,133
[45] * May 1, 1979

[54] FORMING GLASSWARE IN A SECTOR OF A CIRCLE

[75] Inventor: Anthony T. Zappia, Carmel, Ind.

[73] Assignee: Ball Corporation, Muncie, Ind.

[*] Notice: The portion of the term of this patent subsequent to Dec. 20, 1994, has been disclaimed.

[21] Appl. No.: 820,776

[22] Filed: Aug. 1, 1977

Related U.S. Application Data

[62] Division of Ser. No. 718,405, Aug. 30, 1976, Pat. No. 4,063,918.

[51] Int. Cl.$^2$ ............................................. C03B 9/14
[52] U.S. Cl. ................................... 65/76; 65/77; 65/79; 65/239
[58] Field of Search ............... 65/235, 80, 79, 239, 65/234, 230, 77, 76

[56] References Cited

U.S. PATENT DOCUMENTS

| | | | |
|---|---|---|---|
| 1,833,623 | 11/1931 | Smith | 65/234 |
| 2,084,285 | 6/1937 | Wadman | 65/230 |
| 2,151,876 | 3/1939 | Wadman | 65/230 |
| 3,216,813 | 11/1965 | Mumford | 65/239 |
| 3,445,218 | 5/1969 | Trudeau | 65/235 |
| 4,004,906 | 1/1977 | Rowe | 65/229 X |
| 4,009,016 | 2/1977 | Foster | 65/79 X |

*Primary Examiner*—S. Leon Bashore
*Assistant Examiner*—Frank W. Miga
*Attorney, Agent, or Firm*—Jenkins, Coffey & Hyland

[57] ABSTRACT

Glassware forming apparatus includes a first arm for supporting a first neck ring and a second arm for supporting a first blow head. The first and second arms are supported from a vertical column for projection along its axis and for independent pivotal movement about the axis. The apparatus also includes a parison mold and two blow molds. Each of the blow molds is divided into two portions, the portions of each mold being joined at a hinge. The axis of each hinge extends generally parallel to the column axis. Apparatus is provided for opening and closing the molds, and for pivoting and projecting the first and second arms to convey glassware blanks supported by the neck ring alternately to the two blow molds from the parison mold, and to move the blow head between the two blow molds to blow the glassware blanks into articles of glassware. The illustrated apparatus for pivoting and projecting each of the arms along the common axis includes a pinion gear attached to a shaft, the other end of which is attached to one of the arms. First and second racks alternately engage the pinion gear. A frame supports the racks for selective shifting movement. The frame itself is supported for movement longitudinally of the racks to turn the pinion gear when one or the other of the racks is in engagement with the pinion gear. Piston-and-cylinder arrangements are provided for longitudinally controllably moving the frame support apparatus and for controllably shifting the frame selectively to engage the pinion gear with one of the first and second racks. The frame is preferably pivotally mounted on the frame support and has a first position in which the first rack engages the pinion gear and a second position in which the second rack engages the pinion gear. The method of the present invention comprises the steps of forming blanks in the parison mold and alternately depositing the blanks in the blow molds to be formed into glassware.

3 Claims, 7 Drawing Figures

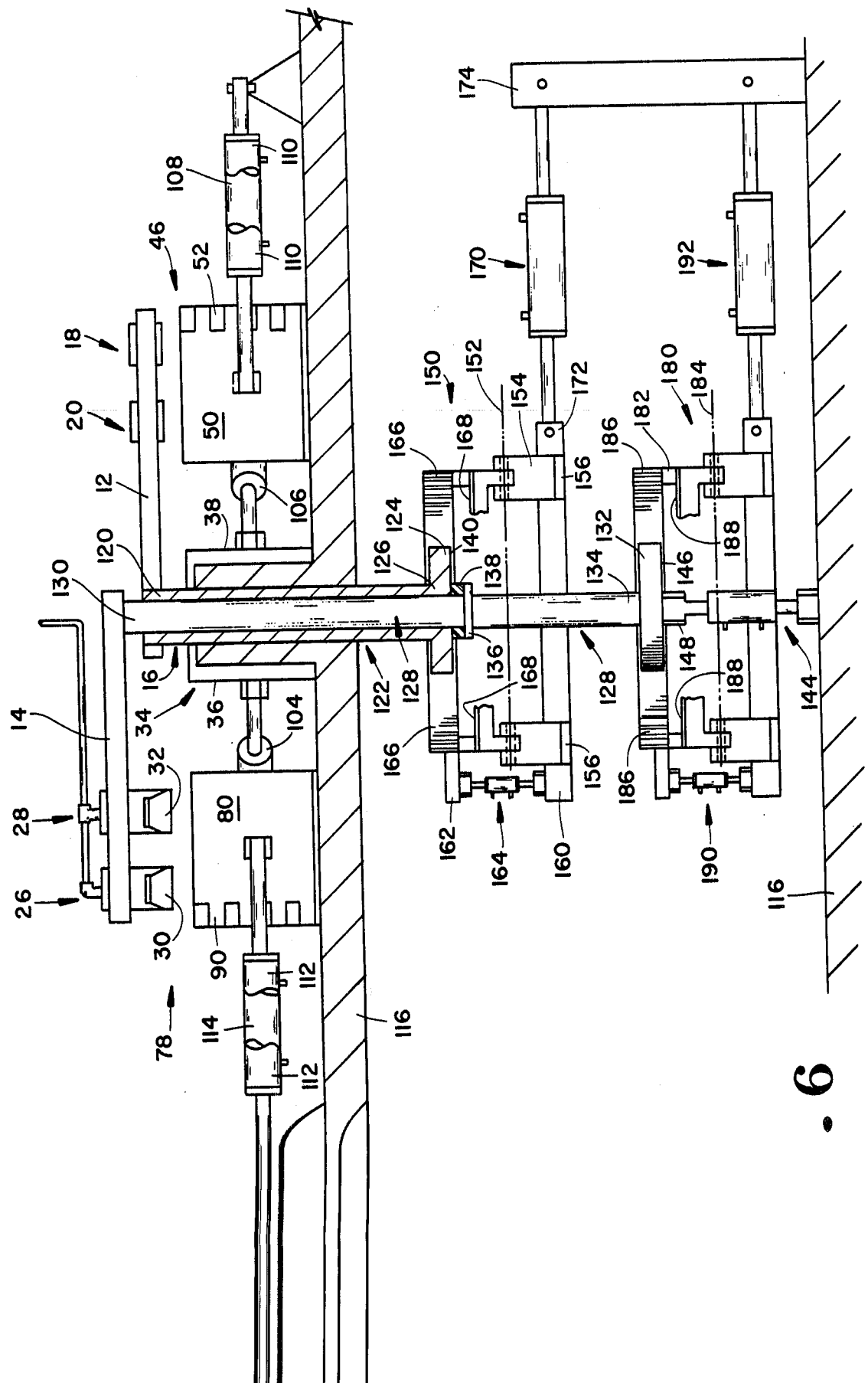

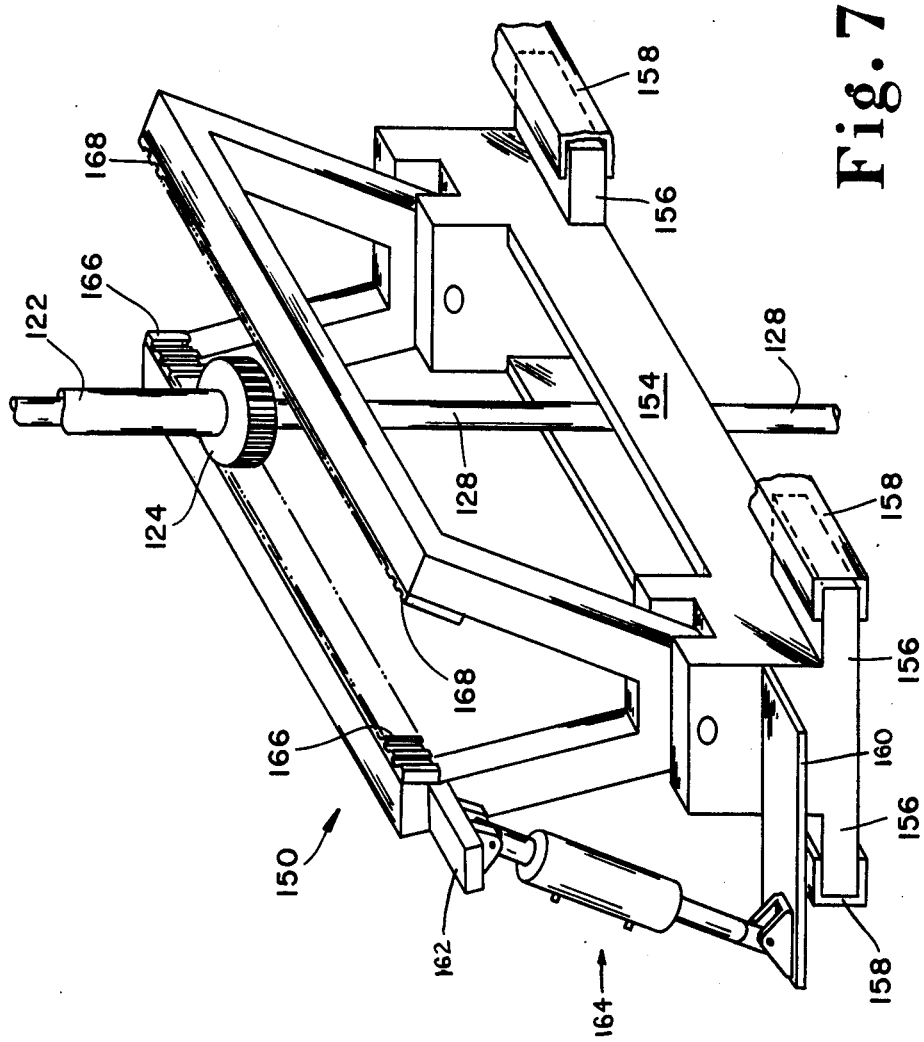

FORMING GLASSWARE IN A SECTOR OF A CIRCLE

This is a Divisional Application of Application Ser. No. 718,405, filed Aug. 30, 1976 now U.S. Pat. No. 4,063,918 issued Dec. 20, 1977.

This invention relates to methods and apparatus for forming glassware.

There are several well known types of apparatus for performing various methods of forming hollow glassware. Among these are apparatus for forming hollow glassware by pressing glassware blanks upright in one or more parison molds, transferring the pressed blanks linearly through one or more successive stages of reheating, transferring the reheated blanks to a blow mold and blowing the blanks therein. The following United States patents are presented as illustrative of several well known methods and apparatus for forming hollow glassware: U.S. Pat. No. 3,914,120 issued Oct. 21, 1975, to Foster; U.S. Pat. No. 3,329,492 issued July 4, 1967, to Kinsley; U.S. Pat. No. 3,434,820 issued Mar. 25, 1969, to Zappia et al; and U.S. Pat. No. 3,169,846 issued Feb. 16, 1965 to Zappia.

Reference is here also made to my two co-pending United States patent applications Ser. No. 718,404, now U.S. Pat. No. 4,058,388 and Ser. No. 718,406, now U.S. Pat. No. 4,062,668 filed of even date herewith, both titled GLASSWARE FORMING APPARATUS AND METHOD and assigned to the same assignee as the present invention.

It is an object of the present invention to provide an apparatus for forming hollow glassware which constitutes an improvement over the prior-art devices.

According to the present invention, a glassware forming apparatus includes a first arm for supporting at least one neck ring, a second arm for supporting at least one blow head and a column for supporting the first and second arms. The column supports the arms for projection along a common axis and for pivotal movement about the axis. The apparatus further includes a parison mold and two blow molds. Each of the blow molds is divided into two portions, the portions being joined at a hinge having an axis extending generally parallel to the column axis. Means are provided for opening and closing the molds, for pivoting and projecting the first and second arms to convey glassware blanks supported by the neck ring alternately to the two blow molds from the parison mold, and for moving the blow head between the two blow molds to blow the glassware blanks alternately conveyed thereto into articles of glassware.

Further, according to the invention, the first and second arms are independently vertically movable and independently horizontally pivotal upon the column.

According to a preferred embodiment of the invention, the three molds and a location at which finished articles of hollow glassware are deposited are spaced about the periphery of a circle with the column axis as its center. The interiors of the blow molds face the column when the blow molds are open. The three molds and the finished glassware location are spaced at substantially equal intervals about the periphery of the circle. The first arm moves alternately in arcs of approximately 90° between the parison mold and each of the blow molds, and the second arm moves alternately in arcs of approximately 90° between the finished glassware location and each of the blow molds.

Additionally, according to the present invention, apparatus is provided for pivoting the arms about the column axis and projecting the arms along the column axis. The apparatus includes a pinion gear attached to a shaft, the other end of which is attached to one of the first and second arms. First and second racks alternately engage the pinion gear. A frame supports the racks for selective shifting movement. The frame itself is supported for movement longitudinally of the racks to turn the pinion gear when one or the other of the racks is engaged with the pinion gear. Means are provided for longitudinally controllably moving the frame support means and for controllably shifting the frame selectively to engage the pinion gear with one of the first and second racks.

In a preferred embodiment of the invention, the frame is pivotally mounted on the frame support means and has a first position in which the first rack engages the pinion gear and a second position in which the second rack engages the pinion gear. The means for controllably shifting the frame includes a piston-and-cylinder arrangement actuable to pivot the frame upon the frame support means between the first and second positions. The means for longitudinally and controllably shifting the frame includes a piston-and-cylinder arrangement linearly actuable in a first direction to rotate the pinion in a first direction in engagement with the first rack and linearly actuable in a second direction to rotate the pinion in the first direction in engagement with the second rack.

Further, according to the present invention, a method for forming hollow glassware includes the steps of forming a gob of molten glass into a first glassware blank suspended from a neck ring in a parison mold. The neck ring is moved about the pivotal axis of a first arm to a position in registry with a first blow mold. The first blank is transferred to the first blow mold, suspending the blank in the mold. The blank is then released from the neck ring, and the first arm is pivoted to return the neck ring to a position on the parison mold to receive another gob of molten glass. A second arm is then pivoted about the column axis to move a blow head to a position in registry with the first blow mold. The blow head engages the first blank and blows it into a first piece of glassware. The first blank is blown into a first article of finished glassware. Another gob of molten glass is formed into a second glassware blank suspended from the neck ring in the parison mold. The first arm pivots about the column axis to move the second blank to a position in registry with a second blow mold, and the second blow mold closes, suspending the second blank therein. The neck ring releases the second blank and returns to a position in registry with the parison mold to receive another gob of molten glass. The blow head is moved by pivoting the second arm about the column axis to a position for depositing the first article of finished glassware at a location for finished glassware. The glassware is deposited. The second arm moves the blow head to a position in registry with the second blow mold. The blow head engages the second blank, which is then blown into a second article of glassware. Finally, the second arm is pivoted about the column axis to move the blow head to the position for depositing the second article at the finished glassware location.

The invention may best be understood by reference to the following description of a preferred embodiment of the invention and the accompanying drawings which illustrate the invention. In the drawings:

FIG. 6 is a fragmentary sectional side elevational view of an apparatus for pivoting and projecting the first and second arms along the supporting column axis; and FIG. 7 is a fragmentary perspective view of the apparatus of FIG. 6.

Figure 1:
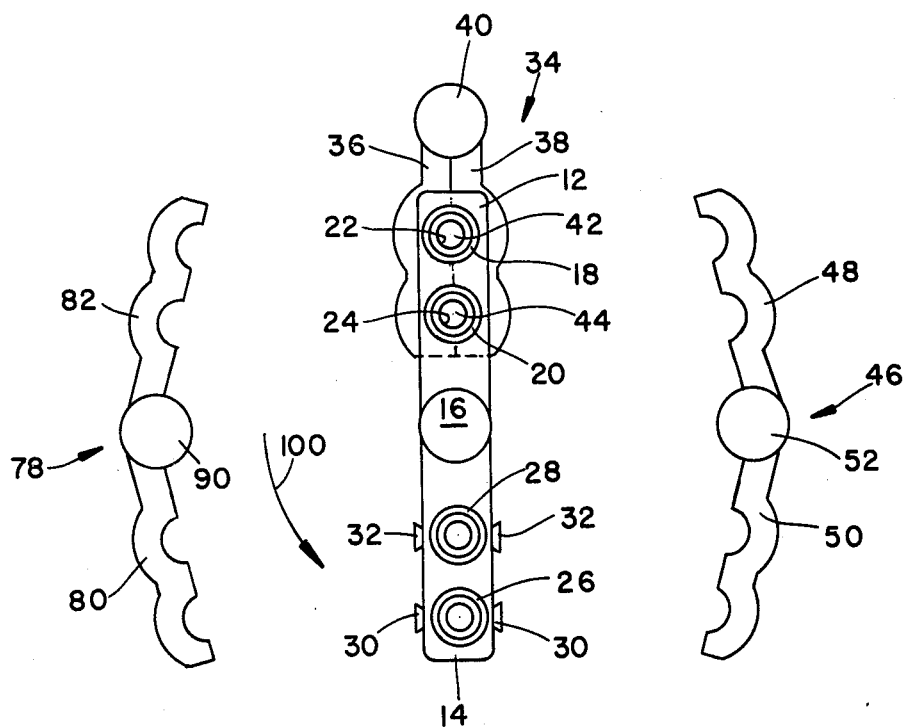
FIG. 1 is a somewhat diagrammatical top plan view of the apparatus of the present invention at an initial position.

In the illustrated embodiment of the invention, two independently movable arms 12, 14 are mounted upon a vertically extending column 16. Arm 12 includes two neck rings 18, 20 having central vertical openings 22, 24, respectively, therethrough. Arm 14 includes two blow heads 26, 28 having pairs 30, 32, respectively, of take-out jaws thereon. Located adjacent column 16 is a parison mold 34 which is divided into vertical halves 36, 38. Halves 36, 38 open about a vertically extending hinge 40, the axis of which is parallel to the axis of column 16.

Referring now specifically to FIG. 1, in which arms 12, 14 are in their initial positions and parison mold 34 is closed, gobs of molten glass are dropped through openings 22, 24 in neck rings 18, 20. The gobs are then pressed upright through neck rings 18, 20 by a pressing apparatus (not shown) to form two blanks 42, 44. The pressing apparatus is located above parison mold 34. Parison mold 34 opens about hinge 40 to the position illustrated in FIG. 2. Arm 12 is projected slightly vertically upwardly along the axis of column 16, carrying with it blanks 42, 44. At this time a blow mold 46 having vertical halves 48, 50 mounted upon a vertical hinge 52 is open and empty as indicated in solid lines in FIG. 1. The axis of hinge 52 is parallel to the axis of column 16.

Figure 2:
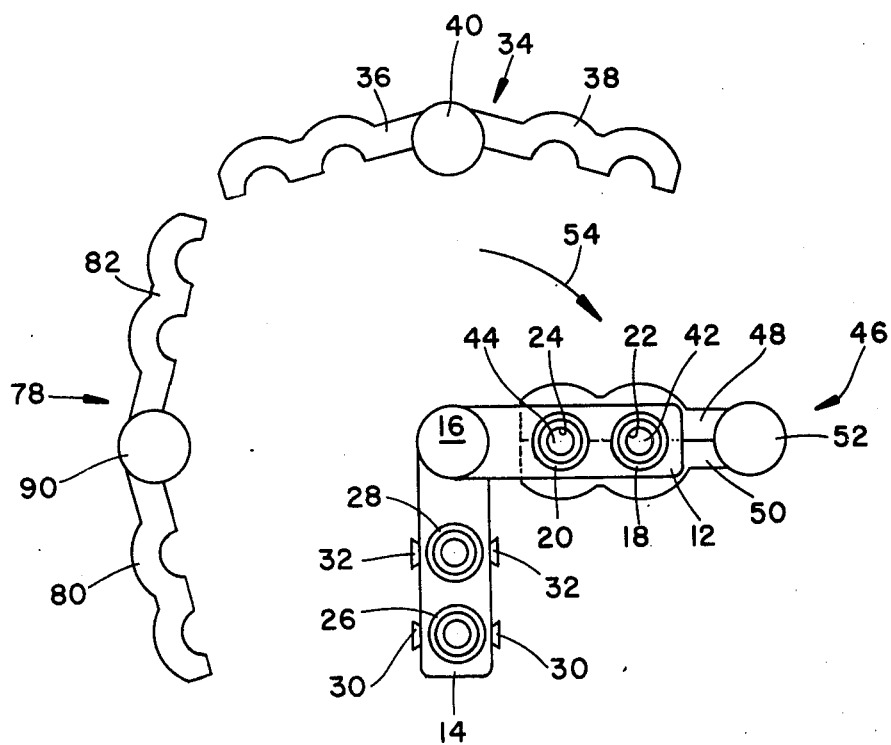
FIG. 2 is a top plan view of the apparatus of FIG. 1 in a second position.

Arm 12 pivots about the axis of column 16 in the direction indicated by arrow 54 in FIG. 2. When blanks 42, 44 are in vertical registry with blow mold 46, arm 12 is projected slightly downwardly and blow mold 46 closes upon blanks 42, 44 to the position illustrated in solid lines in FIG. 2.

Figure 3:
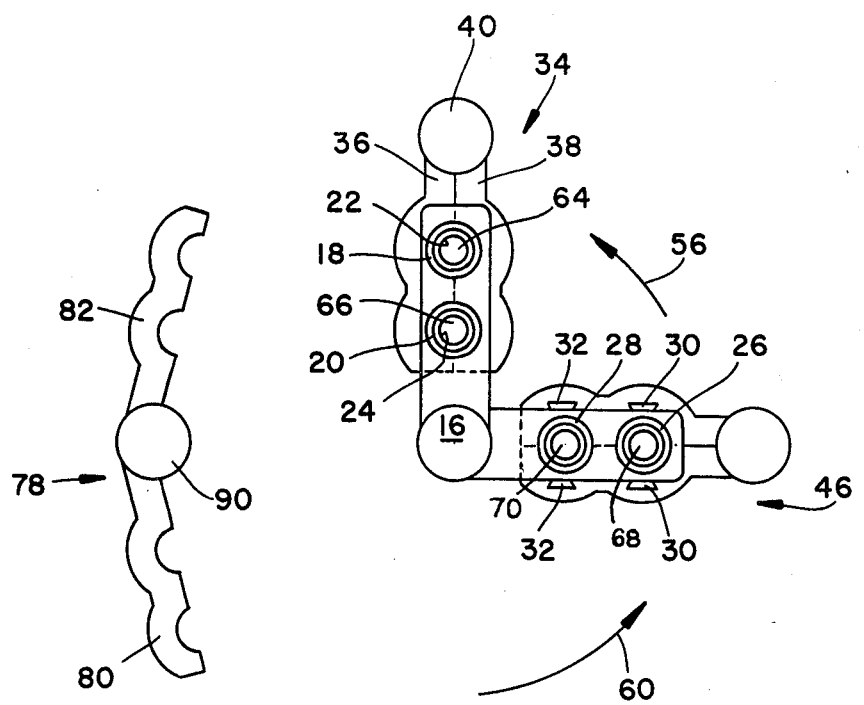
FIG. 3 is a top plan view of the apparatus of FIGS. 1 and 2 in a third position.

Neck rings 18, 20 release blanks 42, 44 which are now suspended in blow mold 46. Blanks 42, 44 begin to reheat in blow mold 46. Arm 12 is projected vertically upwardly so that neck rings 18, 20 clear the necks of blanks 42, 44. Arm 12 is then pivoted through 90° in the direction of arrow 56 in FIG. 3, returning to its position overlying parison mold 34. As arm 12 is pivoted, arm 14 pivots through 90° in the direction of arrow 60 of FIG. 3, placing blow heads 26, 28 over blanks 42, 44 in blow mold 46. Arm 12 is projected vertically downwardly and parison mold 34 closes. Two fresh gobs of glass are dropped through openings 22, 24 in neck rings 18, 20.

Arm 14 projects vertically downwardly so that blow heads 26, 28 engage blanks 42, 44. Blow heads 26, 28 are then energized from a source of compressed air (not shown). As air is applied to the blow heads, two bottles begin to be blown in mold 46 from the reheated blanks 42, 44.

As blowing of bottles from blanks 42, 44 proceeds, the two freshly deposited gobs in parison mold 34 are pressed by the pressing apparatus through openings 22, 24 in neck rings 18, 20, respectively. Simultaneously, two new blanks 64, 66 are completed in parison mold 34, and blowing of two bottles 68, 70 from blanks 42, 44 in blow mold 46 is completed. The supply of compressed air to blow heads 26, 28 is interrupted, causing take-out jaws 30, 32 to engage bottles 68, 70. Molds 34, 46 both open. Arms 12, 14 both project vertically upwardly, arm 12 carrying with it blanks 64, 66 and arm 14 carrying with it bottles 68, 70. Arm 12 pivots in the direction of arrow 72 of FIG. 4 to a position overlying a second blow mold 78. Blow mold 78 has two halves 80, 82, pivotal about a vertical axis on a hinge 90.

Figure 4:
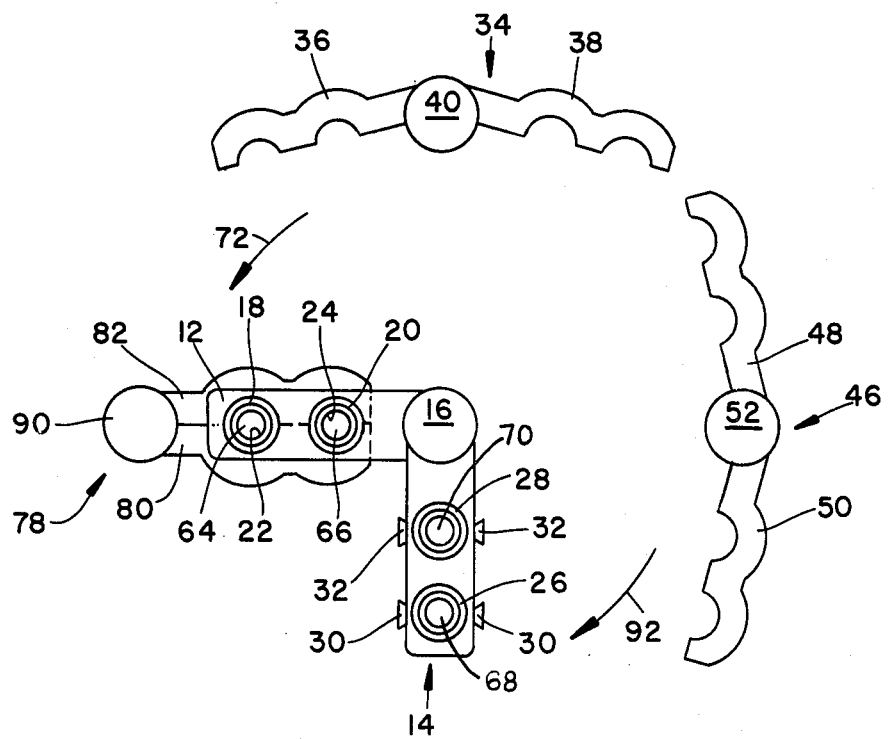
FIG. 4 is a top plan view of the apparatus of FIGS. 1-3 at a fourth position.

Arm 14 pivots 90° in the direction of arrow 92 of FIG. 4 and stops when bottles 68, 70 are located over a dead plate 94. Arms 12, 14 are both projected vertically downwardly. The supply of compressed air to blow heads 26, 28 is energized, causing take-out jaws 30, 32 to release bottles 68, 70. The bottles are then removed from the dead plate.

Blow mold 78 closes about blanks 64, 66. Blanks 64, 66 are thereby supported in blow mold 78. Neck rings 18, 20 release the blanks 64, 66 and arm 12 projects vertically upwardly so that the neck rings will not damage the necks of blanks 64, 66. Arm 14 also projects vertically upwardly.

Figure 5:
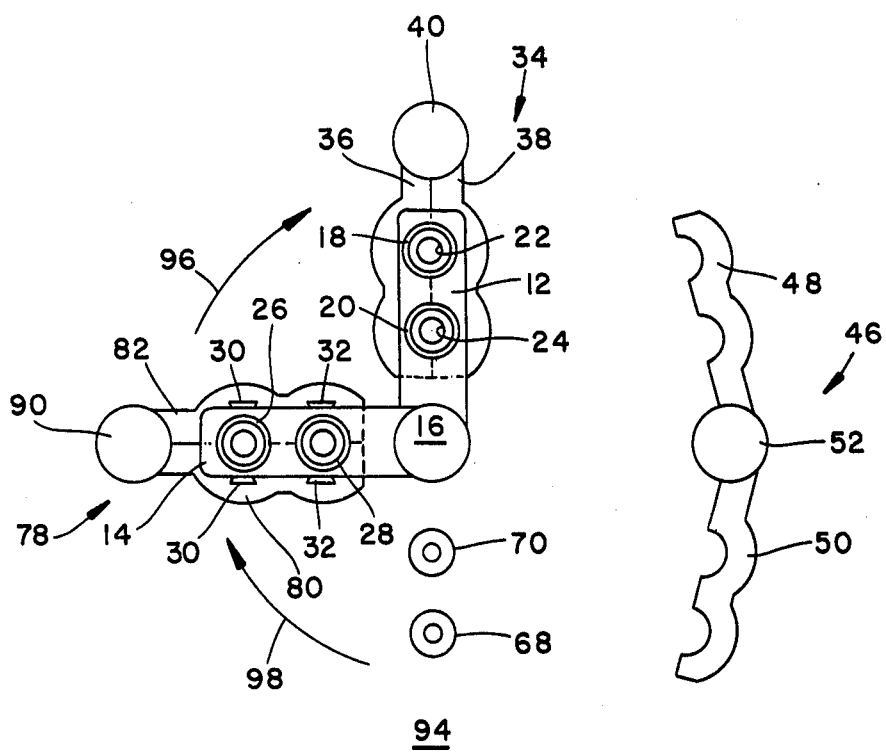
FIG. 5 is a top plan view of the apparatus of FIGS. 1-4 at a fifth position.

Arms 12, 14 rotate through 90° in the directions of arrows 96, 98, respectively, of FIG. 5. Arm 12 stops when neck rings 18, 20 are in registry over parison mold 34. Arm 14 stops with blow heads 26, 28 in registry over blanks 64, 66. Both arms project vertically downwardly. Neck rings 18, 20 engage parison mold 34 to prepare parison mold 34 to receive two more gobs of glass so that two more fresh blanks can be pressed.

As the fresh gobs are being deposited and pressed, blow heads 26, 28 engage the necks of blanks 64, 66. Compressed air is switched on through blow heads 26, 28, and two more bottles are blown from blanks 64, 66 by the compressed air supplied to blow heads 26, 28. After the new bottles are blown, the supply of compressed air is interrupted, causing take-out jaws 30, 32 to engage the freshly blown bottles. Blow mold 78 opens to the position illustrated in FIG. 1.

Arm 14 projects vertically upwardly and pivots through 90° in the direction indicated by arrow 100 of FIG. 1. Arm 14 then projects slightly downwardly so that the two freshly blown bottles rest on dead plate 94. Take-out jaws 30, 32 open, depositing two more freshly blown bottles on dead plate 94. The apparatus is then ready to begin the next cycle of operation.

FIGS. 6 and 7 illustrate an apparatus for pivoting arms 12, 14 about the axis of column 16 and for projecting the arms vertically along the column axis. FIG. 6 also illustrates apparatus for opening and closing molds 34, 46 and 78.

The apparatus for opening and closing the molds comprises a plurality of two-way piston-and-cylinder arrangements, e.g., pneumatic or hydraulic pistons and cylinders 104, 106, 108, 110, 112 and 114. One end of each of devices 104-114 is attached to the top of a table 116. Table 116 supports column 16 and molds 34, 46 and 78. The other movable ends of devices 104-114 are attached, respectively, to mold halves 36, 38, 48, 50, 80 and 82. Actuation of devices 104-114 in a first direction opens molds 34, 46 and 78. Actuation of devices 104-114 in the opposite direction closes the molds.

In the apparatus for pivoting and projecting arms 12, 14, arm 12 is securely mounted on the upper end 120 of a hollow shaft 122. A pinion gear 124 is attached to the lower end 126 of shaft 122. Shaft 122 is supported for rotation in column 16. A second shaft 128 extends through hollow shaft 122. Arm 14 is mounted on the upper end 130 of shaft 128. A second pinion gear 132 is mounted on the lower end 134 of shaft 128. A collar 136 projects radially outwardly from the axis of shaft 128 beneath pinion gear 124. A thrust bearing 138 on shaft 128 is inserted between collar 136 and the downwardly facing surface 140 of pinion gear 124. Collar 136 thus pivotally supports shaft 122.

A two-way piston-and-cylinder arrangement 144, e.g., a pneumatic or hydraulic piston and cylinder, is attached to the downwardly facing surface 146 of pinion gear 132 by a swivel joint 148. The other end of device 144 is attached to the table 116 to remain stationary with respect thereto. Actuation of device 144 in a first direction projects both of shafts 122, 128 and arms 12, 14, respectively, vertically upwardly along the axis of column 16 (the axes of shafts 122, 128). Actuation of device 144 in a second and opposite direction projects shafts 122, 128 and arms 12, 14, respectively, vertically downwardly.

The apparatus for pivoting arms 12, 14 about the column 16 axis includes a frame 150. Frame 150 is pivotally mounted about an axis 152 on a frame support apparatus 154. Frame support apparatus 154 includes four horizontally projecting ears 156 at its four corners. Ears 156 longitudinally slidably engage a pair of channels 158 (see FIG. 7) which are mounted on table 116. Frame support apparatus 154 further includes a bracket 160. Frame 150 includes a bracket 162. A two-way piston-and-cylinder arrangement 164 is connected between brackets 160, 162. Frame 150 supports a pair of racks 166, 168. Racks 166 and 168 are alternately selectively engageable with pinion gear 124 when shafts 122, 128 are at their vertically upward extents. Actuation of device 164 pivots frame 150 about axis 152, causing one or the other of racks 166, 168 to engage pinion gear 124. Rack 166 engages pinion gear 124 when device 164 is actuated in a first direction. Rack 168 engages pinion gear 124 when device 164 is actuated in a second and opposite direction.

A two-way piston-and-cylinder arrangement 170 is coupled between a bracket 172 on frame support 154 and a bracket 174 which is attached to table 116. Actuation of device 170 in a first direction when rack 166 engages pinion gear 124 moves frame support member 154 in channels 158 to the right in FIG. 6. and into the page in FIG. 7. Such movement, when rack 166 is engaging pinion gear 124 (see FIG. 7) causes arm 12 to pivot clockwise (in the direction of arrow 54 in FIG. 2). Actuation of device 170 in a second and opposite direction moves frame support member 154 in channels 158 to the left in FIG. 6 and out of the page in FIG. 7. Such movement, when rack 166 is engaging pinion gear 124 (as shown in FIG. 7) causes arm 12 to pivot counter-clockwise (when viewed from above) in a direction of arrow 56 in FIG. 3. Actuation of device 170 when rack 168 engages pinion gear 124 is not illustrated, but it will be appreciated that actuation of device 164 pivots frame 150 about axis 152 to bring rack 168 into engagement with pinion gear 124. (See FIGS. 6–7). Such actuation of device 170 in the first direction moves frame 150 to the right in FIG. 6, and causes arm 12 to pivot counter-clockwise (in the direction of arrow 72 in FIG. 4). Actuation of device 170 in the second direction when rack 168 engages pinion gear 124 causes arm 12 to pivot clockwise (in the direction of arrow 96 in FIG. 5). It will be appreciated that this arrangement provides for movement of arm 12 from parison mold 34 to blow mold 46, from blow mold 46 to parison mold 34, from parison mold 34 to blow mold 78, and from blow mold 78 to parison mold 34.

A similar selectively movable frame and support assembly 180 controls rotation of pinion gear 132 and the pivotal movement of arm 14. The frame 182 of assembly 180 pivots back and forth about axis 184 to engage one or the other of racks 186, 188 with pinion gear 132. Piston-and-cylinder arrangement 190 controls the motion of frame 182 about axis 184. A piston-and-cylinder arrangement 192 controls the motion of racks 186, 188 linearly. Actuation of device 192 in a first direction moves its frame support member (which is identical to support member 154) in channels (which are identical to channels 158) in a first direction, to the left in FIG. 6. Such movement in the first direction when rack 186 is engaging pinion gear 132 (see FIG. 6) causes arm 14 to pivot counter-clockwise when viewed from above (in a direction of arrow 60 in FIG. 3). Actuation of device 192 in a second and opposite direction (to the right in FIG. 6) when rack 186 engages pinion gear 132 causes arm 14 to pivot clockwise (in the direction of arrow 92 in FIG. 4). Engagement of rack 188 with pinion gear 132 is not illustrated, but it will be appreciated that rack 188 can be brought into engagement with pinion gear 132 by actuation of piston-and-cylinder arrangement 190 to pivot frame member 182 about axis 184 from its position illustrated in FIG. 6. Actuation of device 192 in the first direction (to the left in FIG. 6) when rack 188 engages pinion gear 132 causes arm 14 to pivot clockwise (in the direction of arrow 98 in FIG. 5). Actuation of device 192 in the second direction (to the right in FIG. 6) when rack 188 engages pinion gear 132 causes arm 14 to pivot counter-clockwise (in the direction of arrow 100 in FIG. 1).

The illustrated molds 34, 46, 78 are of a type which is vertically split into two hinged halves. It is to be understood that the method and apparatus of the present invention are also useful with other types of molds. In some other types of parison molds, for example, the mold bottom is in one piece. Blanks are lifted vertically from the mold bottom after pressing instead of the mold separating into two vertical halves to release the blanks. Another type of parison mold with which the present invention is useful includes a one-piece bottom and a collar or bushing which comprises two vertical halves. The bushing halves are joined and are located intermediate the parison bottom and neck ring during blank pressing. When pressing is completed, the halves split, releasing the blank and allowing the neck ring to lift it upwardly from the parison bottom.

What is claimed is:

1. A method of forming glassware from molten glass comprising the steps of forming a gob of molten glass into a first glassware blank suspended from a neck ring in a parison mold, moving the neck ring through a first sector of a circle in a first direction about a generally vertically extending pivotal axis of a first arm to a position in registry with a first blow mold, suspending the first blank in the first blow mold, releasing the first blank from the neck ring, moving the neck ring through the first sector of a circle in a second and opposite direction about the pivotal axis of the first arm to a position to receive another gob of molten glass, moving a blow head supported upon a second arm through a second sector of a circle in the second direction about the generally vertically extending pivotal axis to a position of registry with the first blow mold, engaging the blow head and the first blank, blowing the first blank to a first piece of finished glassware, forming another gob of molten glass into a second glassware blank suspended from the neck ring in the parison mold, moving the neck ring through a third sector of a circle in the second direction about the pivotal axis of the first arm to a position in registry with a second blow mold, suspending the second blank in the second blow mold, releasing the second blank from the neck ring, moving the neck ring through the third sector of a circle in the first direction about the pivotal axis of the first arm to a position to receive another gob of molten glass, moving the blow head through the second sector of a circle in the first direction about the second arm pivot axis to a position for depositing finished glassware blown from the first blank, moving the blow head through a fourth sector of a circle in the first direction about the second arm axis to a position in registry with the second blow mold, engaging the second blank with the blow head, blowing the second blank to a second piece of finished glassware, and moving the blow head through the fourth sector of a circle in the second direction about the second arm axis to a position for depositing the finished glassware blown from the second blank.

2. A method of forming glassware from molten glass comprising the steps of forming a gob of molten glass into a first glassware blank suspended from a neck ring in a parison mold, moving the neck ring through a first sector of a circle in a first direction in a generally horizontal plane about a generally vertically extending pivotal axis of a first arm to a position in registry with a first blow mold, suspending the first blank in the first blow mold, releasing the blank from the neck ring, moving the neck ring through the first sector of a circle in a second and opposite direction about the pivotal axis of the first arm to a position to receive another gob of molten glass, blowing the first blank to a piece of finished glassware in the first blow mold, transferring the finished glassware from the first blow mold to a finished glassware position, forming another gob of molten glass into a second glassware blank suspended from the neck ring in the parison mold, moving the neck ring through a second sector of a circle in the second direction in the generally horizontal plane about the pivotal axis of the first arm to a position in registry with a second blow mold, suspending the second blank in the second blow mold, releasing the second blank from the neck ring, moving the neck ring through the second sector of a circle in the first direction about the pivotal axis of the first arm to a position to receive another gob of molten glass, blowing the second blank to a piece of finished glassware in the second blow mold, and transferring the finished glassware from the second blow mold to the finished glassware position.

3. A method of forming glassware from molten glass comprising the steps of forming a first blank from a gob of molten glass, transferring the first blank to a first blow mold, closing the first blow mold to suspend the first blank therein, moving a blow head through a first sector of a circle in a first direction about the generally vertically extending pivotal axis of an arm to a position in registry with the first blow mold, engaging the blow head with the first blank, blowing the first blank to a first piece of finished glassware, forming a second blank from a gob of molten glass, transferring the second blank to a second blow mold, closing the second blow mold to suspend the second blank therein, moving the blow head and first piece of finished glassware through the first sector of a circle in a second and opposite direction about the arm axis to a position for depositing finished glassware blown from the first blank, depositing the first piece of finished glassware, moving the blow head through a second sector of a circle in the second direction about the arm axis to a position in registry with the second blow mold, engaging the second blank and the blow head, blowing the second blank to a second piece of finished glassware, and moving the blow head and second piece of finished glassware through the second sector of a circle in the first direction about the arm axis to a position for depositing the second piece of finished glassware.

* * * * *

UNITED STATES PATENT AND TRADEMARK OFFICE
CERTIFICATE OF CORRECTION

PATENT NO. : 4,152,133
DATED : May 1, 1979
INVENTOR(S) : Anthony T. Zappia

It is certified that error appears in the above–identified patent and that said Letters Patent are hereby corrected as shown below:

Column 7, line 4, (claim 1), change "of" to --in--.

Signed and Sealed this

Ninth Day of October 1979

[SEAL]

Attest:

RUTH C. MASON
*Attesting Officer*

LUTRELLE F. PARKER
*Acting Commissioner of Patents and Trademarks*